Figure 6:
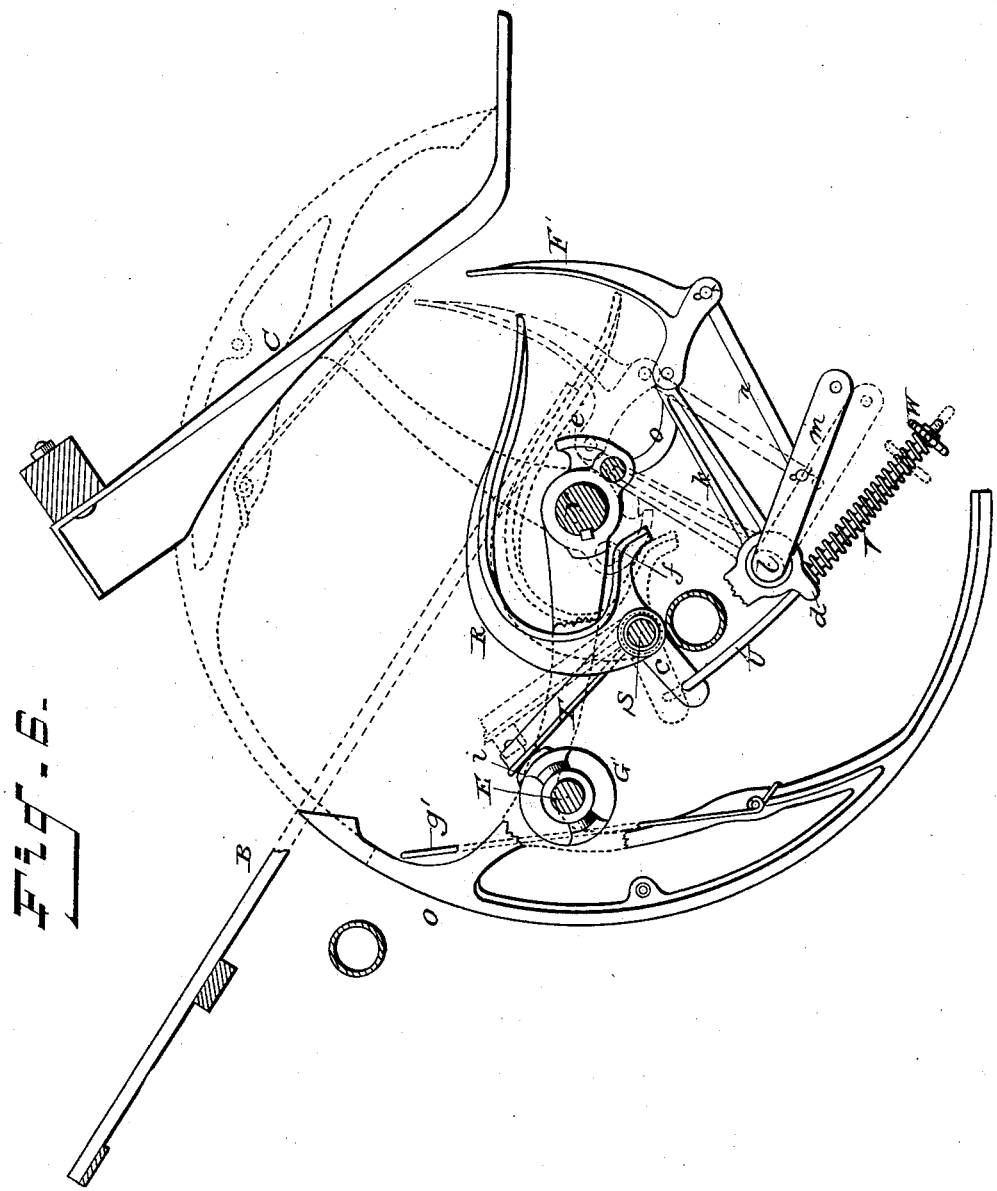

(No Model.)  15 Sheets—Sheet 1.
W. BUTTERFIELD.
GRAIN BINDING MACHINE.
No. 333,922.  Patented Jan. 5, 1886.
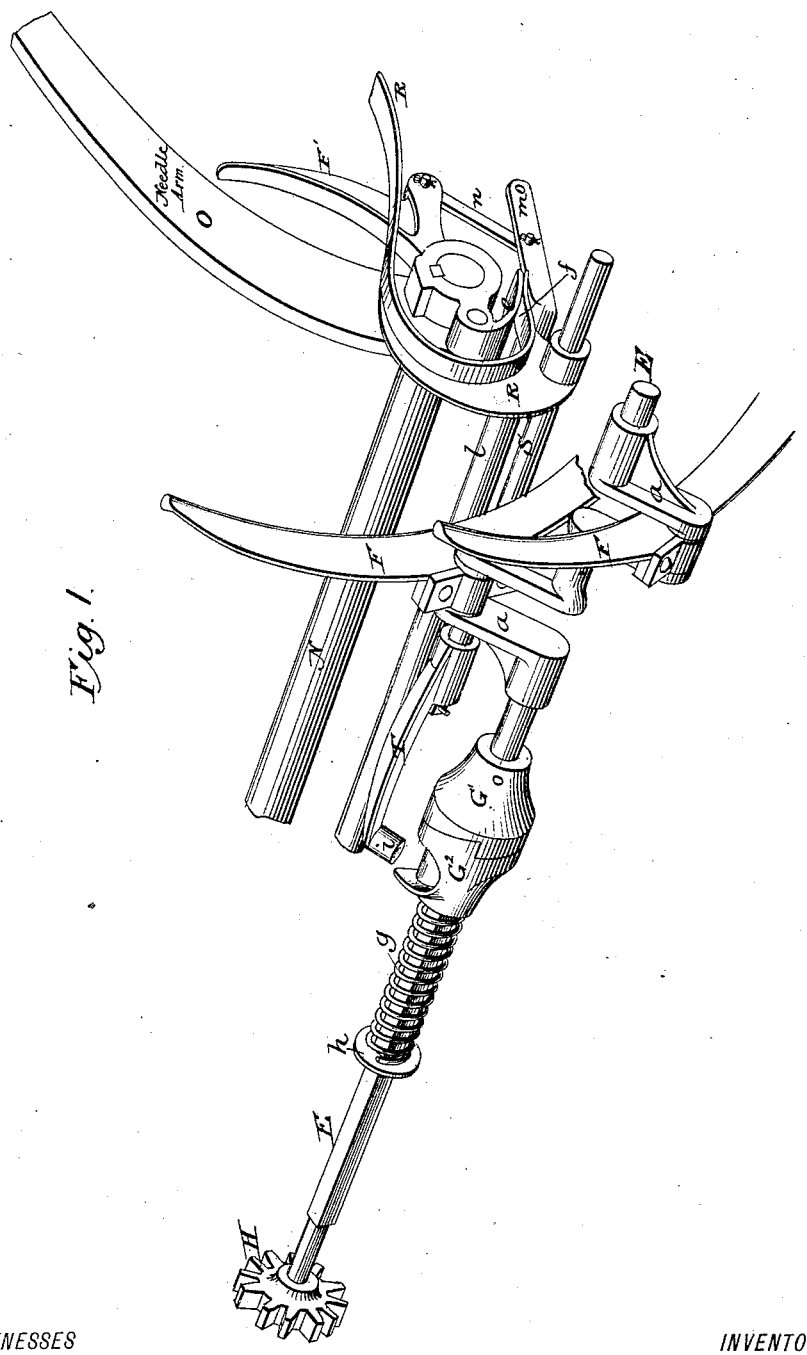

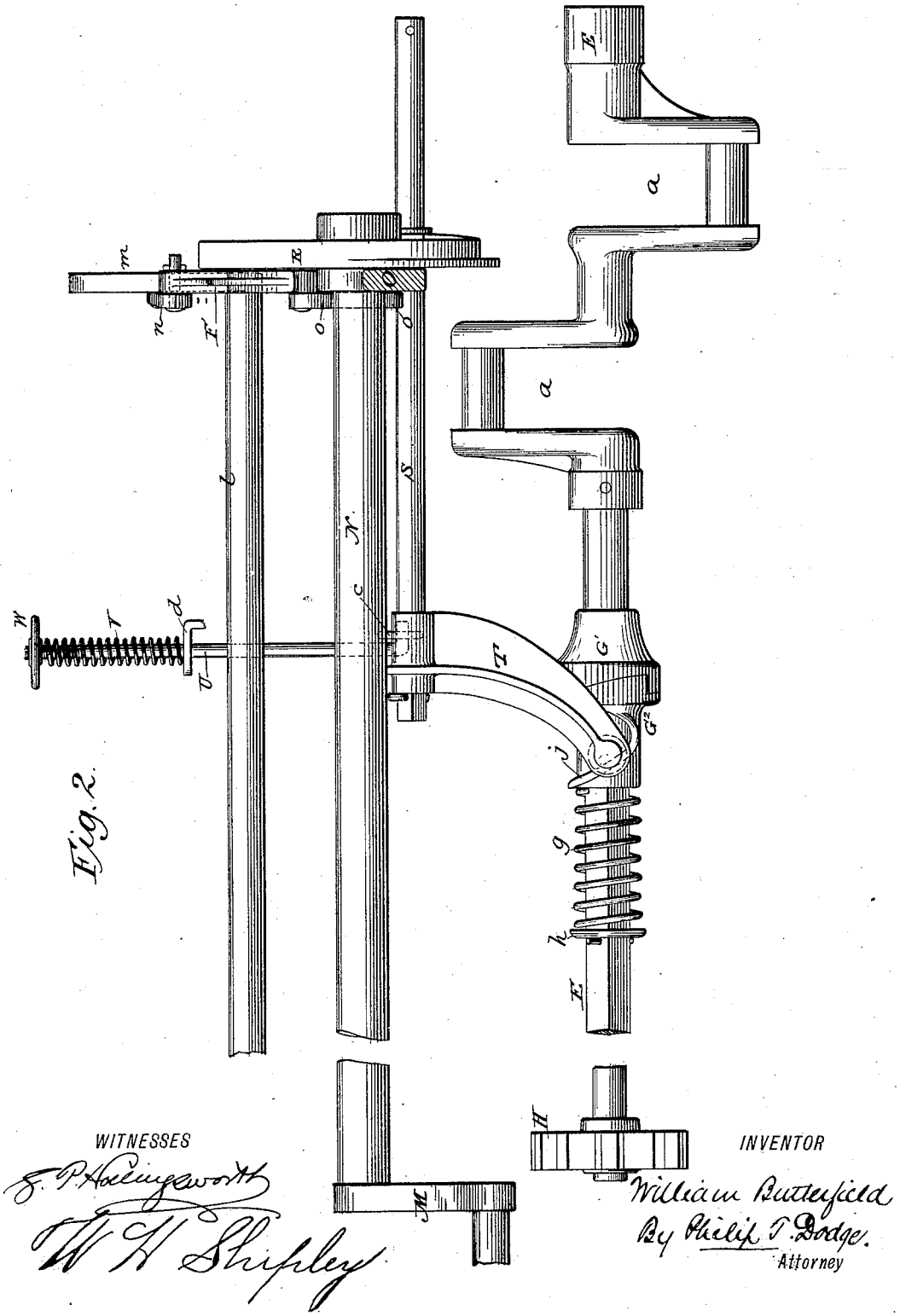

(No Model.) 15 Sheets—Sheet 3.
W. BUTTERFIELD.
GRAIN BINDING MACHINE.
No. 333,922. Patented Jan. 5, 1886.
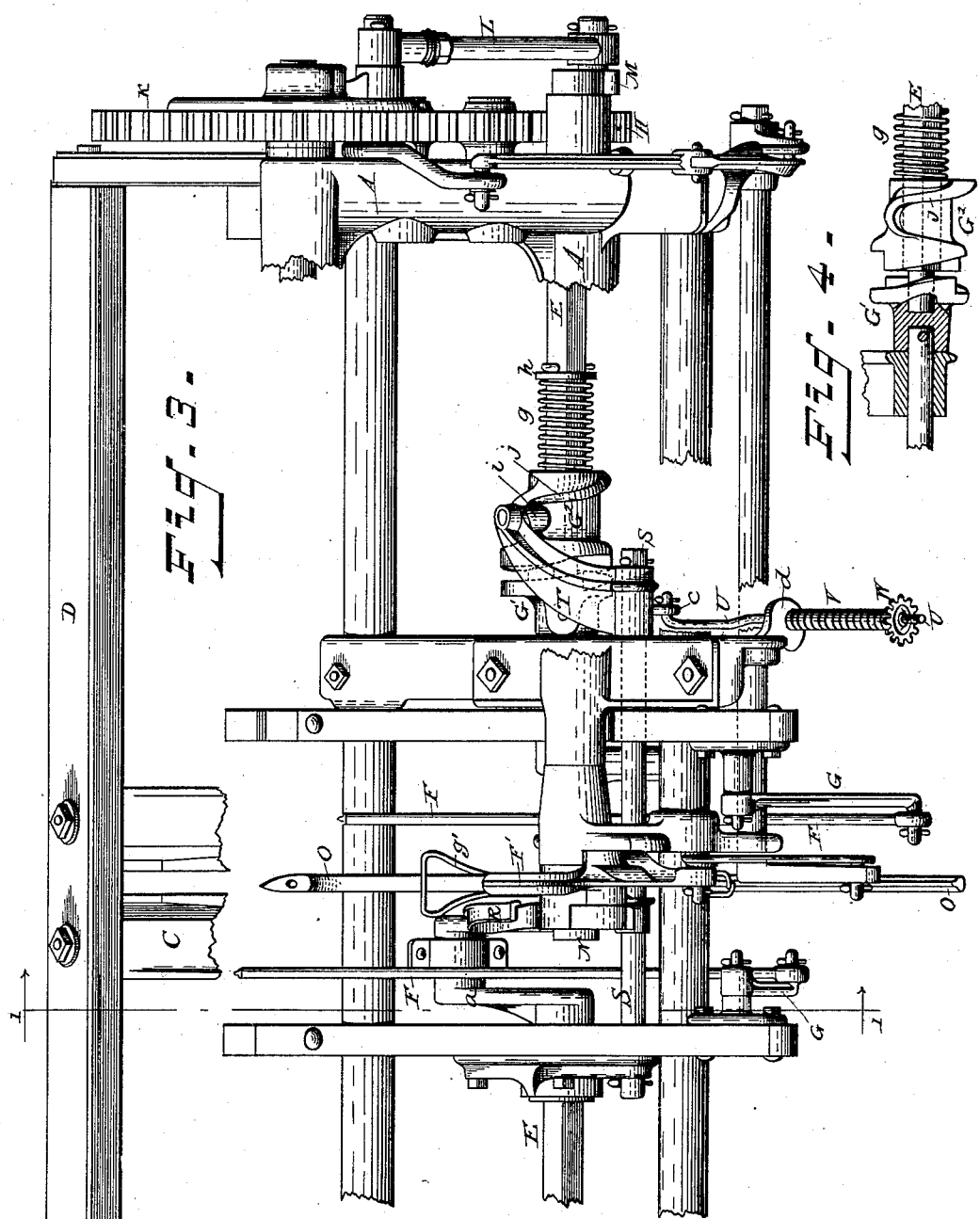

(No Model.) 15 Sheets—Sheet 4.
W. BUTTERFIELD.
GRAIN BINDING MACHINE.
No. 333,922. Patented Jan. 5, 1886.
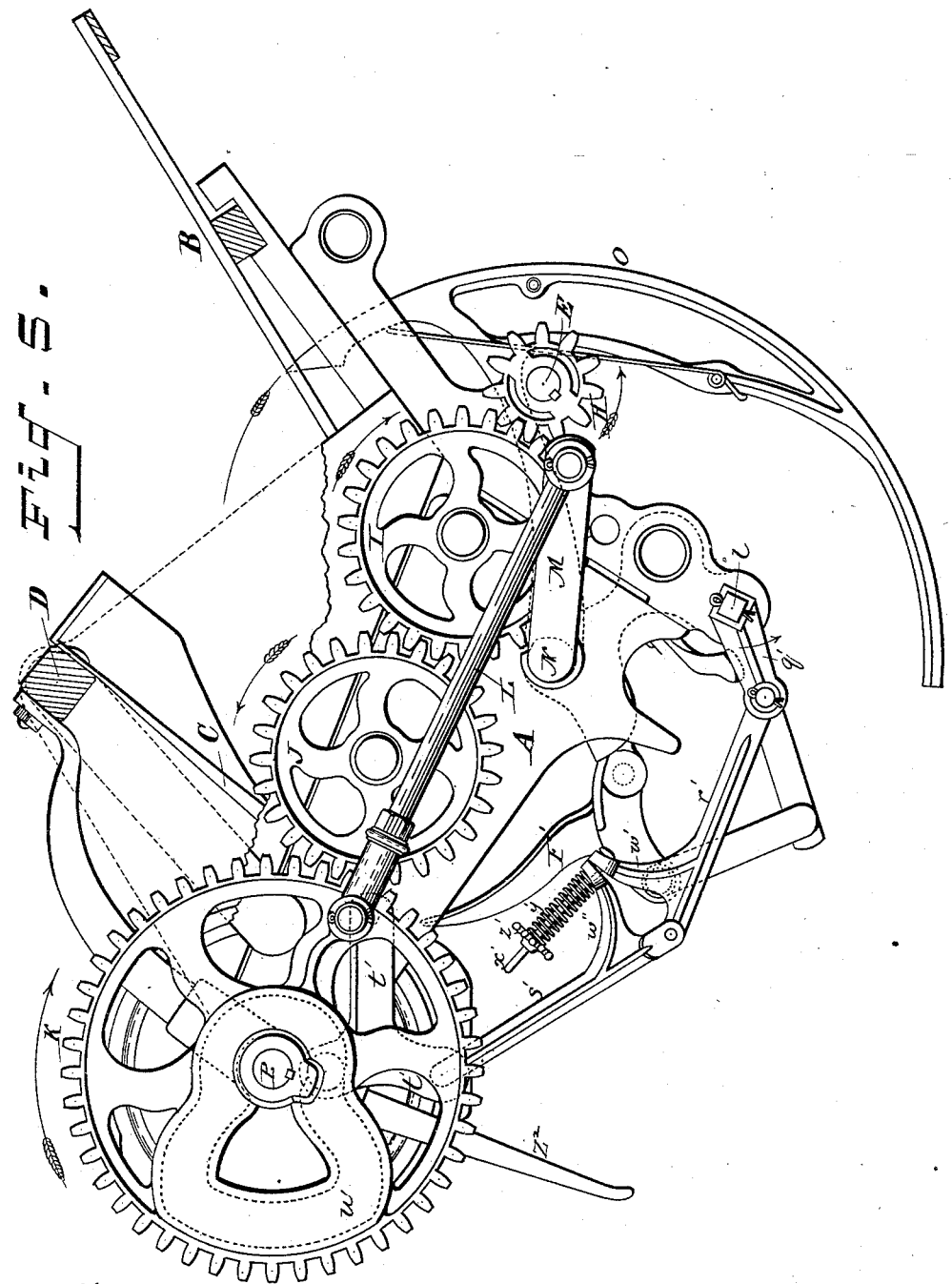
Witnesses:
Sidney P. Hollingsworth
W. H. Shipley
Inventor:
William Butterfield
By his attorney
Philip T. Dodge (No Model.)

15 Sheets—Sheet 5.

W. BUTTERFIELD.
GRAIN BINDING MACHINE.

No. 333,922. Patented Jan. 5, 1886.

Witnesses:
Sidney P. Hollingsworth
W. H. Shipley

Inventor:
William Butterfield
By his Attorney
Philip T. Dodge.

(No Model.)  15 Sheets—Sheet 6.

W. BUTTERFIELD.
GRAIN BINDING MACHINE.

No. 333,922.  Patented Jan. 5, 1886.

Attest.
Sidney P. Hollingsworth
W. H. Shipley

Inventor
William Butterfield
By his attorney
Philip T. Dodge (No Model.) 15 Sheets—Sheet 7.
W. BUTTERFIELD.
GRAIN BINDING MACHINE.

No. 333,922. Patented Jan. 5, 1886.

Witnesses
Sidney P. Hollingsworth
W. H. Shipley

Inventor
William Butterfield
By his Attorney
Philip T. Dodge.

N. PETERS, Photo-Lithographer, Washington, D. C.

(No Model.)  15 Sheets—Sheet 8.

W. BUTTERFIELD.
GRAIN BINDING MACHINE.

No. 333,922. Patented Jan. 5, 1886.

Witnesses:
Sidney P. Hollingsworth
W. H. Shipley

Inventor:
William Butterfield
By his Attorney
Philip T. Dodge (No Model.) 15 Sheets—Sheet 10.

W. BUTTERFIELD.
GRAIN BINDING MACHINE.

No. 333,922. Patented Jan. 5, 1886.

Witnesses: Inventor:
William Butterfield
By his attorney
Philip T. Dodge (No Model.)  
15 Sheets—Sheet 11.

W. BUTTERFIELD.
GRAIN BINDING MACHINE.

No. 333,922. Patented Jan. 5, 1886.

Witnesses:  
Sidney P. Hollingsworth  
W. W. Shipley

Inventor:  
William Butterfield  
By his Attorney  
Philip T. Dodge.

(No Model.) 15 Sheets—Sheet 12.
W. BUTTERFIELD.
GRAIN BINDING MACHINE.

No. 333,922. Patented Jan. 5, 1886.

Witnesses:
Sidney P. Hollingsworth
W. H. Shipley

Inventor.
William Butterfield
By his Attorney
Philip T. Dodge.

(No Model.)  15 Sheets—Sheet 14.

W. BUTTERFIELD.
GRAIN BINDING MACHINE.

No. 333,922. Patented Jan. 5, 1886.

Attest
Francis P. Hollingsworth
W. H. Shipley

Inventor
William Butterfield
By his Attorney
Philip T. Dodge.

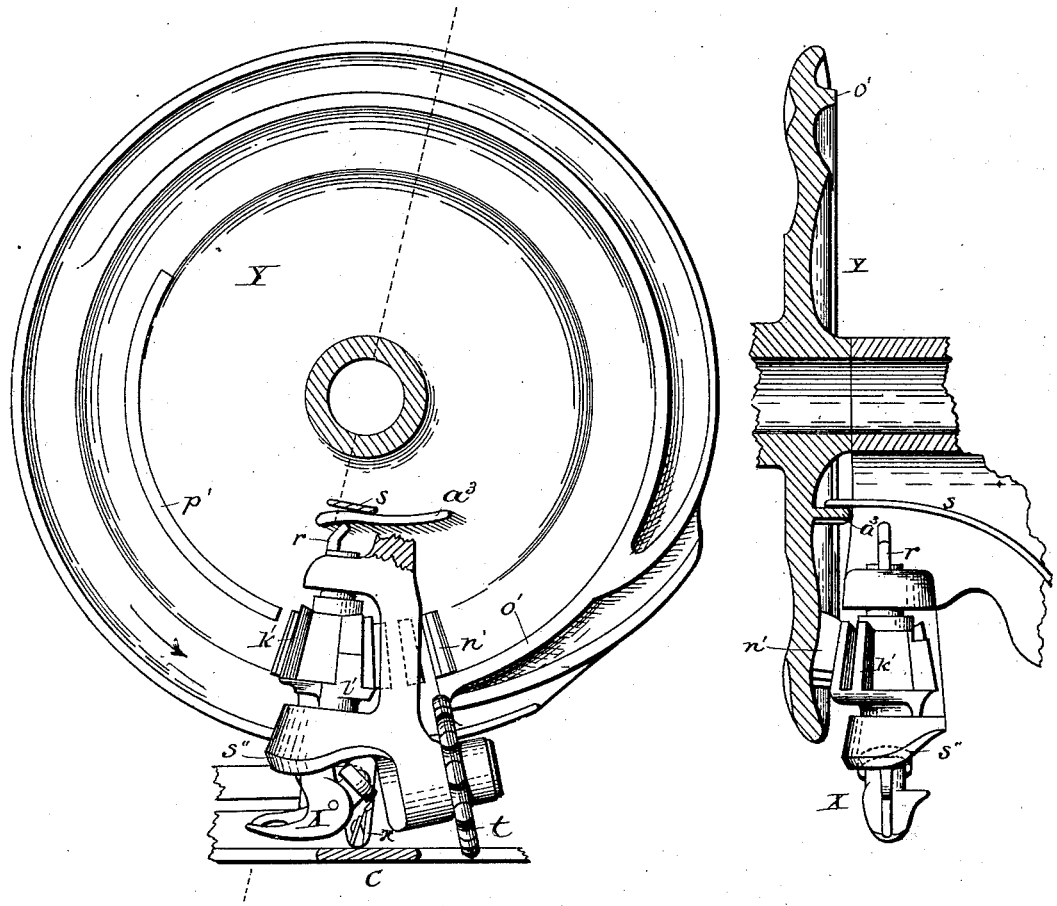

UNITED STATES PATENT OFFICE.

WILLIAM BUTTERFIELD, OF AUBURN, ASSIGNOR TO D. M. OSBORNE & COMPANY, OF NEW YORK, N. Y.

GRAIN-BINDING MACHINE.

SPECIFICATION forming part of Letters Patent No. 333,922, dated January 5, 1886.

Application filed May 26, 1884. Serial No. 132,815. (No model.)

*To all whom it may concern:*

Be it known that I, WILLIAM BUTTERFIELD, of Auburn, in the county of Cayuga and State of New York, have invented certain Improvements in Grain-Binding Machines, of which the following is a specification.

This invention relates to that class of automatic grain-binding machines in which the grain to form a gavel is delivered by a packing mechanism against an opposing arm or compressor, and also against devices adapted to yield under a predetermined pressure for the purpose of throwing into action the devices by which the binding operation is effected.

The invention relates to an improved clutch mechanism for imparting motion to the binding devices proper, and to trip mechanism for throwing the same into and out of action.
It further relates to an improved manner of constructing and operating the rotary tyer; to a stationary throat-plate of peculiar construction co-operating with the tyer to place the cord thereon previous to the tying of the knot, and to assist in the delivery of the completed knot therefrom; also to a yielding tucking-arm combined with the needle-arm for the purpose of effecting the proper presentation of the cord to the tyer; also to devices for changing the tension of the binding-cord at the proper time; also to various other features of minor importance, which will be hereinafter explained in detail.

Certain of my improvements, as will hereinafter more fully appear, are applicable to machines of different styles or classes; but for the purpose of illustration I have represented in the accompanying drawings a machine of the form which I consider most advantageous.
The machine represented is of the type in which the packers and the needle-arm are arranged to act upward through a binding table or receiver on which the grain is supported, and in which the tying, cutting, and clamping devices are located above a stationary breastplate which overlies the table and grain thereon.

Figure 7:
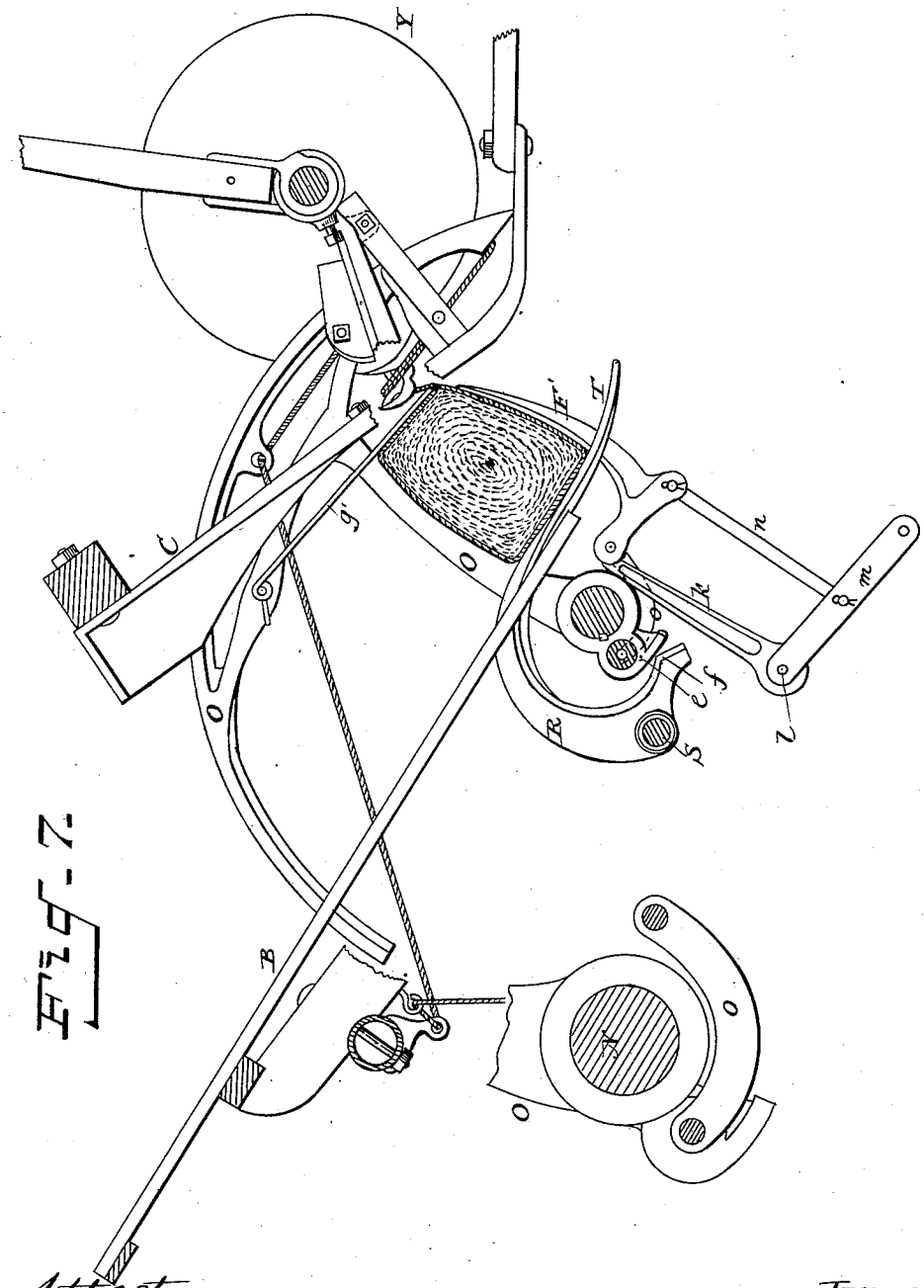
Figure 8:
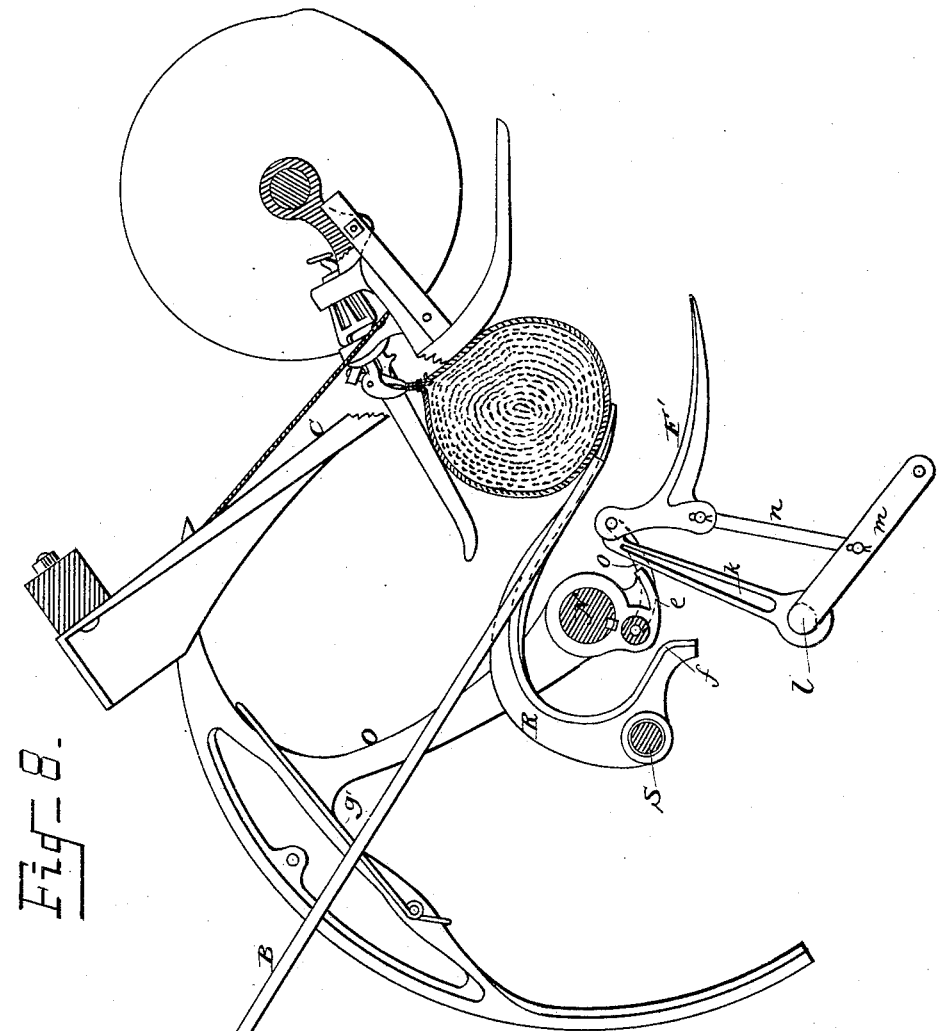
Figure 9:
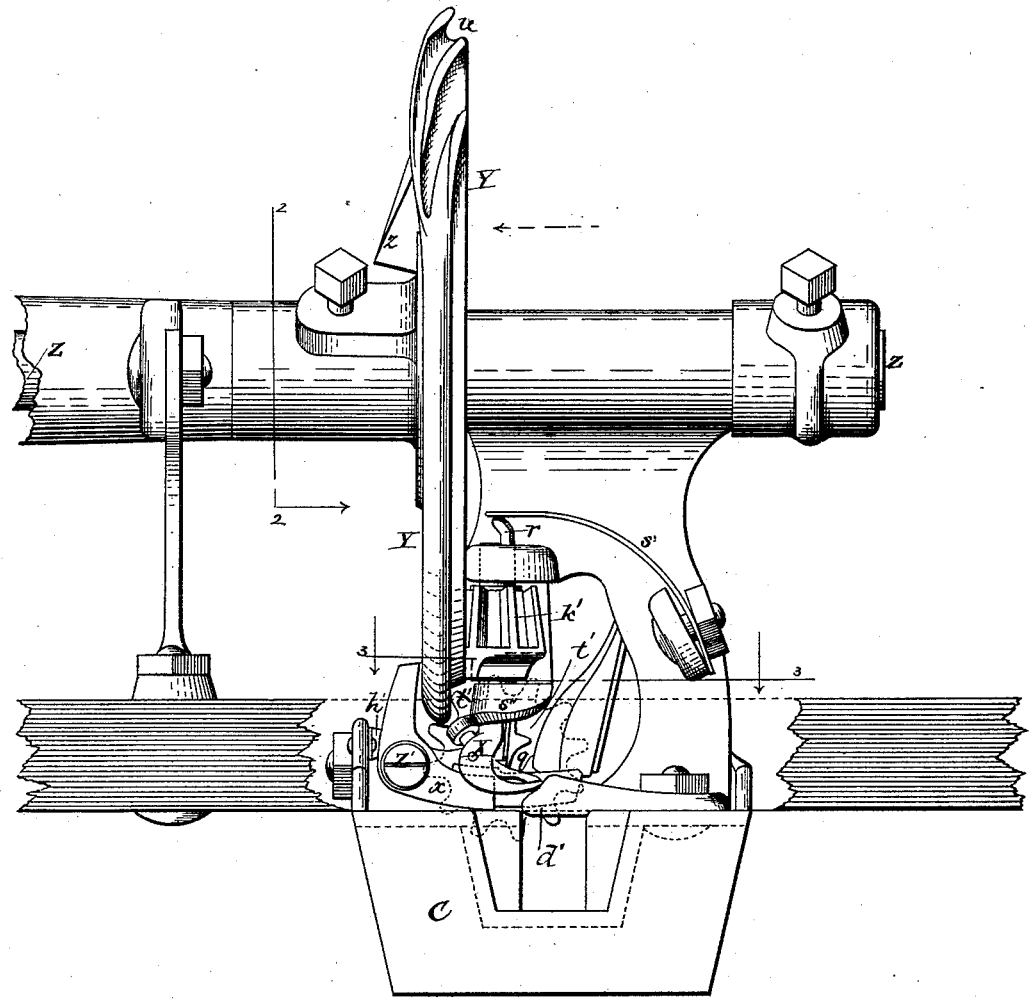
Figure 10:
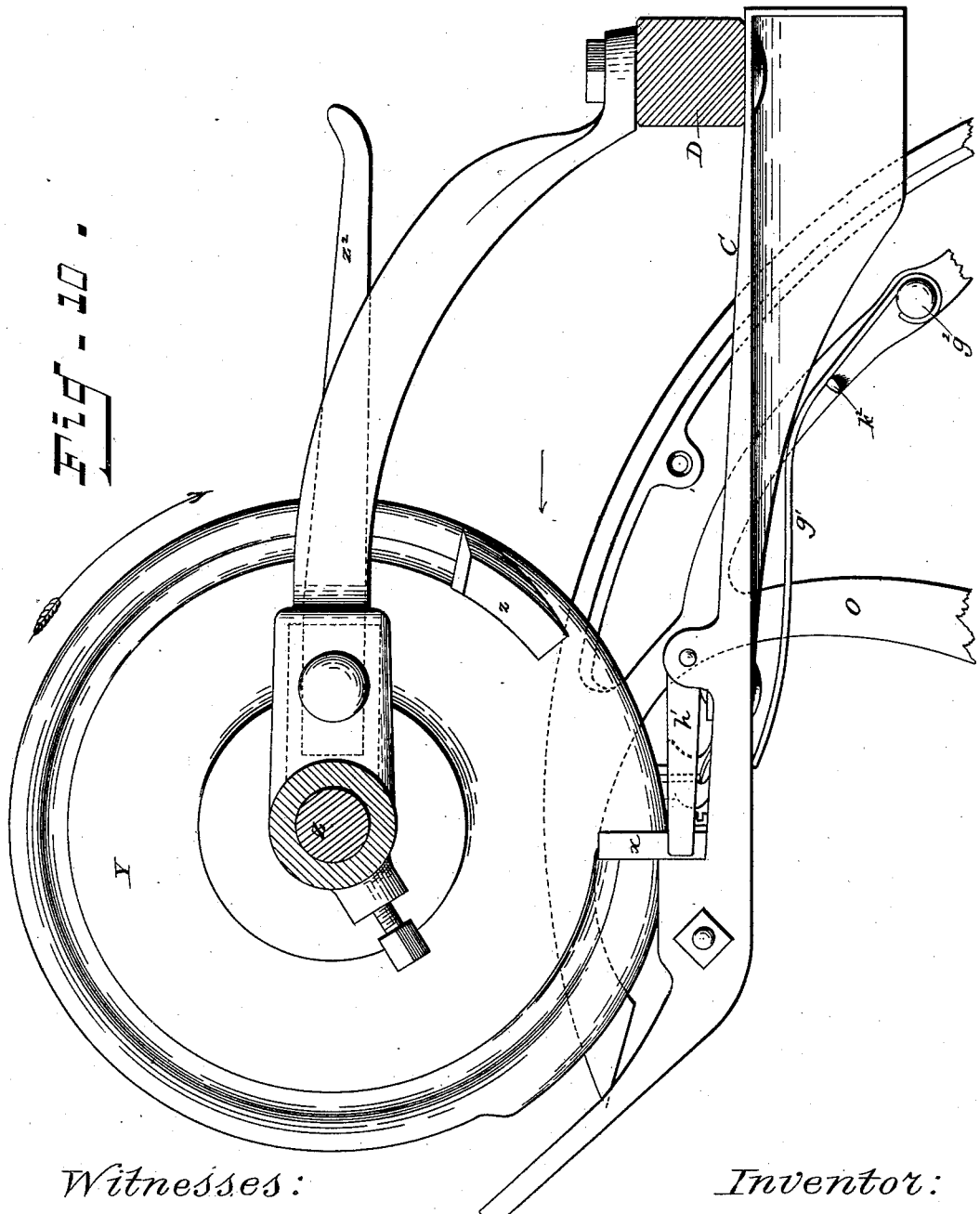
Figure 11:
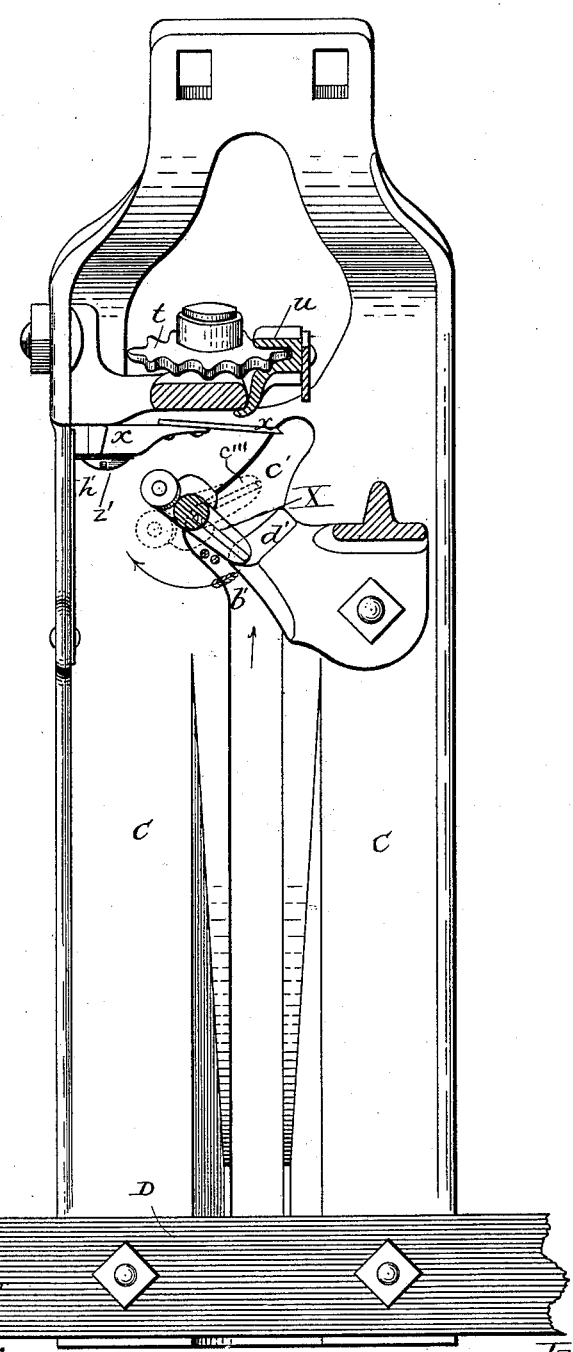
Figure 12:
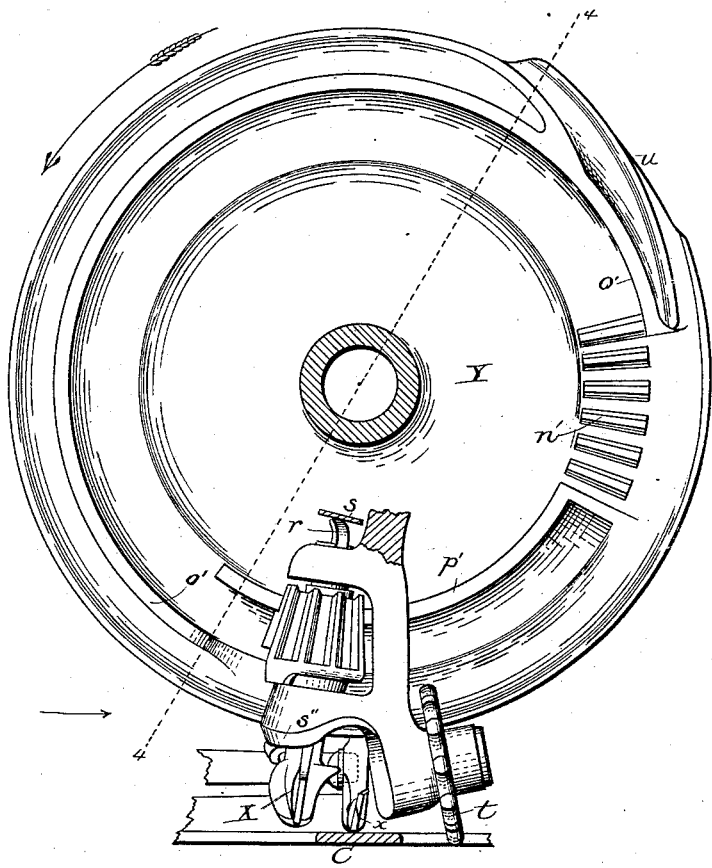
Figure 13:
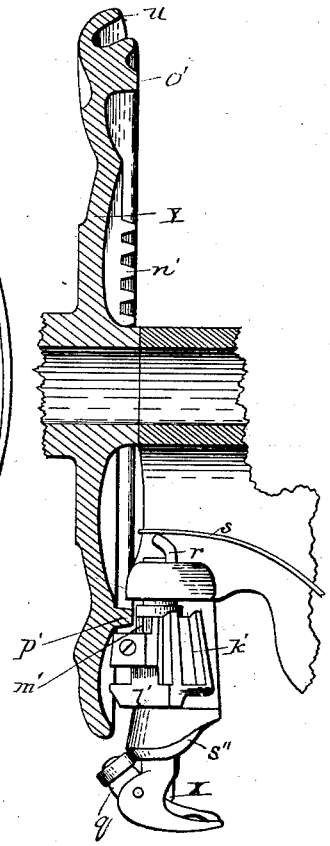
Figure 14:
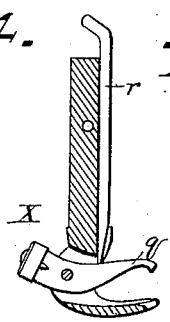
Figure 15:
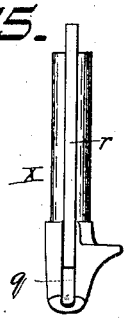
Figure 16:
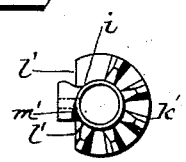
Figure 17:
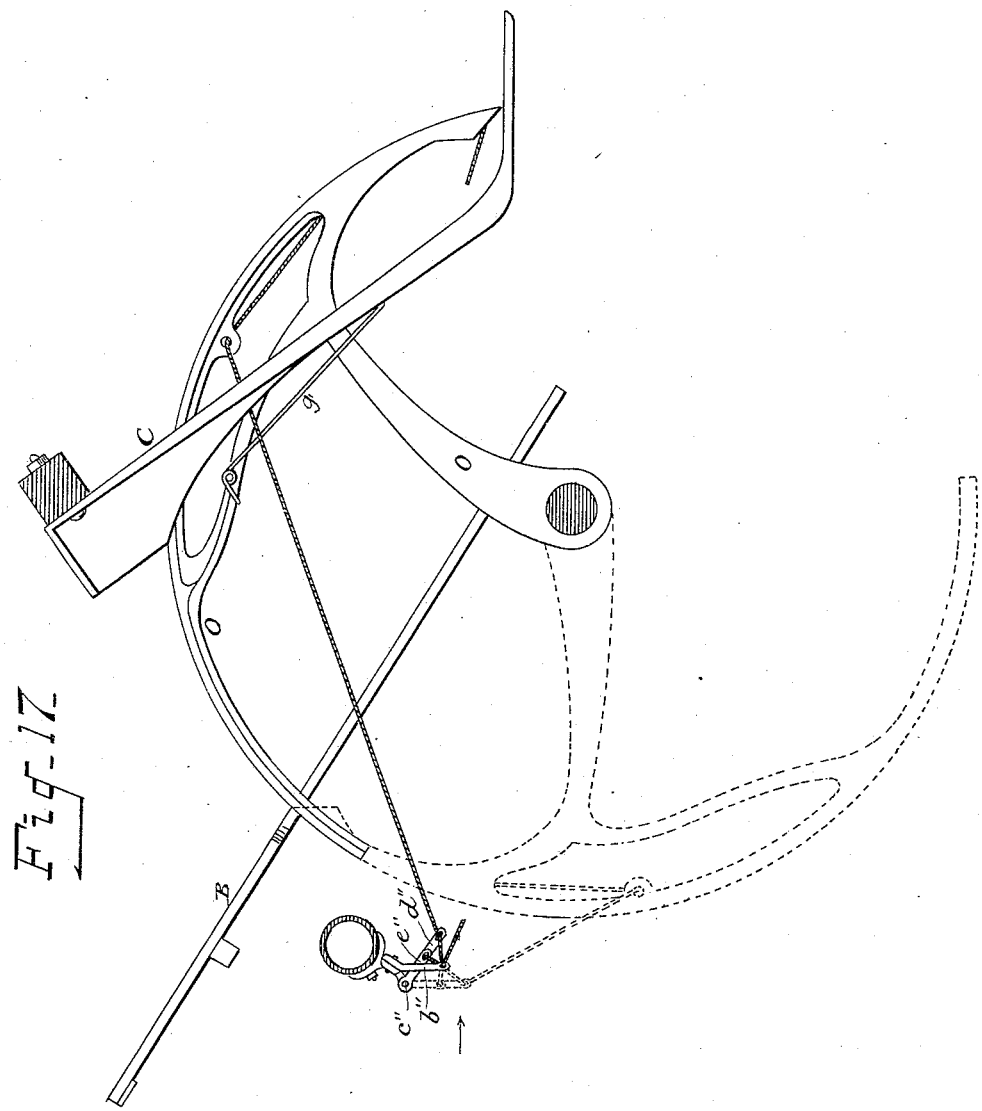
Figure 18:
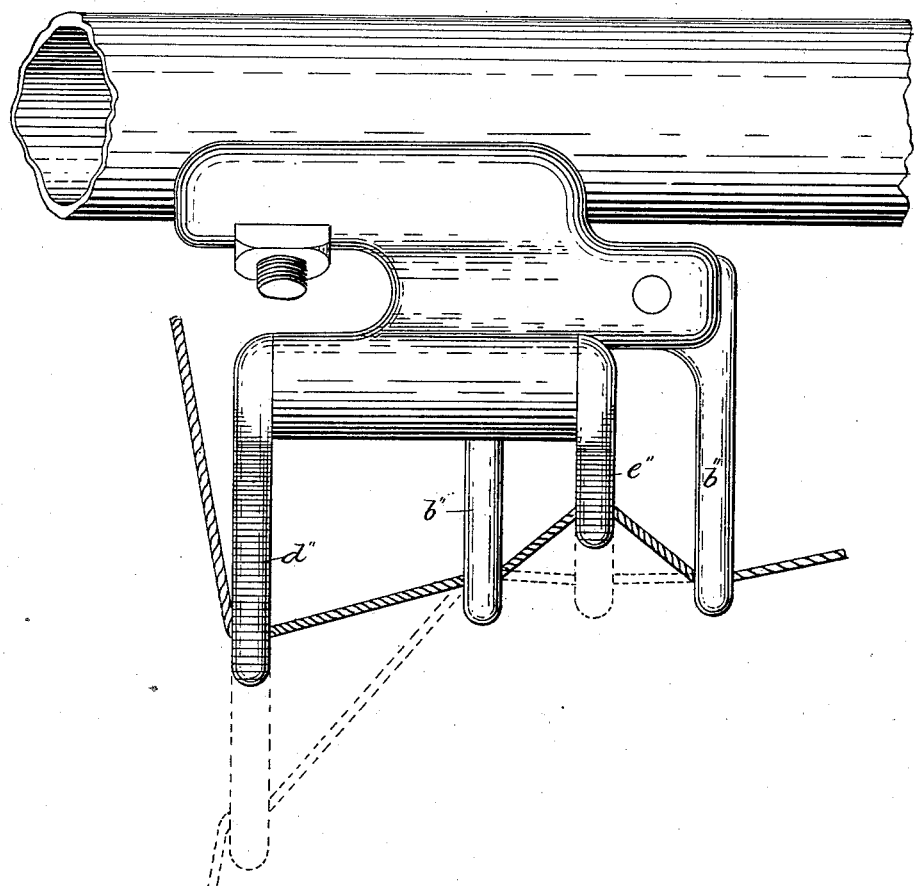
Figure 19:
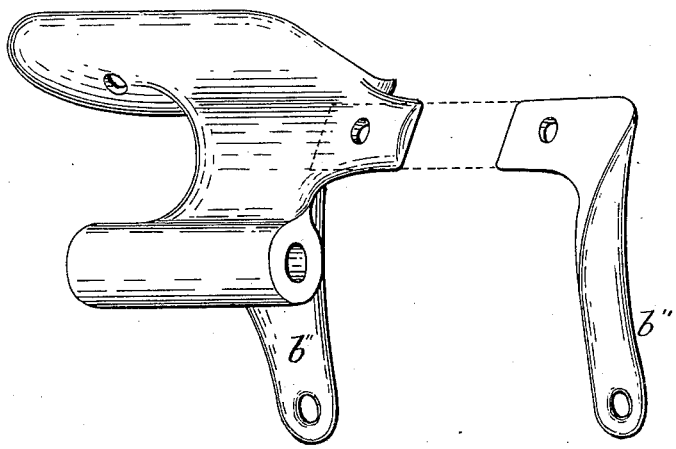
Figure 20:
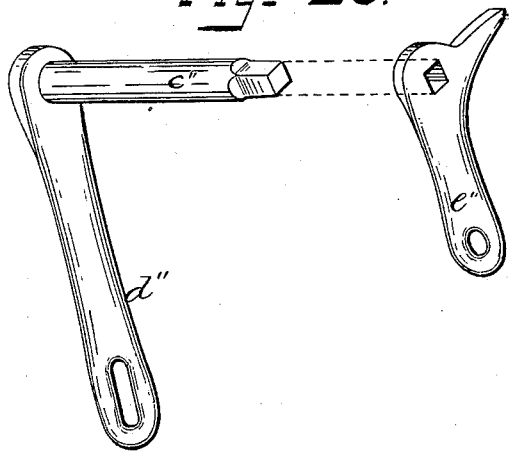

Referring to the accompanying drawings, Figure 1 represents a perspective view of the binder-arm, the compressor, the packers, and the automatic driving and tripping mechanism. Fig. 2 is a top plan view of the same parts. Fig. 3 is an elevation of the binding-machine viewed from the outer or delivery side, the binding-table, a portion of the breast-plate and other customary parts being broken away in order to expose to view the improved features. Fig. 4 is a top plan view of the clutch by which motion is transmitted from the packer-shaft to the binding devices proper—that is to say, the needle-arm and the tying mechanism. Fig. 5 is an end elevation of the binding mechanism, showing the gears by which motion is transmitted to the various parts. Fig. 6 is a vertical cross-section through the binding-machine through the line 1 1 of Fig. 3, looking in the direction indicated by the arrows, the parts being in the position in which they stand previous to the entrance of the grain. Fig. 7 is a similar view showing the parts as they appear with the band in position about the gavel just before the commencement of the tying action. Fig. 8 is a similar view showing the parts at the instant of the delivery of the bound bundle. Fig. 9 is a top plan view of the tying, cutting, and clamping devices and the parts co-operating therewith viewed in the direction indicated by the arrows in Figs. 10 and 11. Fig. 10 is a side elevation of the parts represented in the preceding figure, as viewed from the line 2 2 of Fig. 9, in the direction indicated by the arrow thereon. Fig. 11 is a horizontal section on the line 3 3 of Fig. 9, looking downward, and illustrating the construction and relative position of the throat-plate, the tyer, and the cord clamping and cutting devices. Fig. 12 is an elevation of the parts represented in Fig. 9, looking in the direction indicated by the dotted arrow. Fig. 13 is a cross-section on the line 4 4 of the preceding figure. Fig. 14 is a vertical central section through the tyer-bill and its spindle. Fig. 15 is a face view of the same. Fig. 16 is a top plan view of the tyer-operating pinion, showing its delay-surface. Fig. 17 is an end elevation illustrating the devices for controlling the tension of the binding-cord. Fig. 18 is a top plan view of the tension devices. Figs. 19 and 20 are perspective views of said parts separated from each other. Figs. 21 and 22 are respectively a side view and a cross-section, showing the means for relieving the tyer-bill from the action of its closing spring.

In the drawings, A represents the binder-frame, which may be of any form adapted to sustain the other parts; B, the table on which the grain is delivered and bound, and C the stationary breast-plate suspended above the table by an overhanging arm or standard, D, as usual in machines of this general form. Beneath the binding-table I mount in bearings in the frame a horizontal rotary shaft, E, through which all the parts of the binding mechanism receive motion, this shaft receiving constant motion from any suitable part of the harvester. At one end the shaft has two oppositely-projecting cranks, $a$, carrying packer-arms F, the heel ends of which are connected to swinging links G, as usual, so that the packers rise through the table alternately with a circulatory action for the purpose of carrying the grain forward and packing it into a gavel against an upright non-tripping and yielding compressor-arm, F, which projects through and above the table in the ordinary manner. The driving-shaft E, which is commonly known as the "packer-shaft," is provided at its rear end with a pinion, H, which communicates motion, as shown in Fig. 5, through intermediate gear-wheels, I and J, to a large gear-wheel, K, which latter is provided with a wrist or crank pin carrying one end of a pitman, L. The opposite end of this pitman is connected to a crank-arm, M, on a rock-shaft, N, which is extended horizontally beneath the binding-table, and provided at the opposite end with a needle or cord carrying arm, O, which is vibrated by the rocking motion of the shaft, so as to rise through the binding-table and carry the cord around the gavel to the tying device in a manner familiar to all persons skilled in the art.

From the foregoing it will be perceived that the packer-shaft transmits motion directly to the packers and indirectly to the needle-arm.

In the practical operation of the machine it is desirable to have the binder-arm remain at rest and in a depressed position during the accumulation of the gavel and until the latter has acquired the predetermined size. In order to accomplish this end, by disconnecting the needle-driving portion of the shaft from the packer-cranks I divide the packer-shaft E transversely at any suitable point in its length and connect its two portions by means of a clutch, $G'$ $G^2$, the disconnection of which will permit the needle-operating devices to stand at rest while the packers continue their motion. The clutch consists, as shown, of two hubs secured to the ends of the shaft and toothed on their adjacent faces. The portion $G'$ is cast upon or secured rigidly to that portion of the shaft which bears the cranks, while the portion $G^2$ is arranged to slide endwise on the other portion of the shaft, which is made of a square form, as shown, or provided with a spline to prevent the rotation of the part $G^2$ thereon. A spiral spring, $g$, applied around the rear portion of the shaft bears at one end against the part $G^2$ of the clutch, and at the opposite end against a collar, $h$, of the shaft, and tends to hold the parts of the clutch normally in engagement.

In order to effect the automatic disengagement of the clutch at the completion of the binding operation, I provide an arm, T, secured firmly on one end of a horizontal rock-shaft, S, the opposite end of which is provided with a trip-arm, R, extending through and above the binding-table in position to be depressed by the gavel acting thereon. The arm T, which can move in a vertical direction only, bears at its extremity a stud or roller, $i$. The part $G^2$ of the clutch is formed on the outside with a spiral groove or with a spiral flange, $j$, terminating in a shoulder at one end. The arm T has a heel projection, $c$, from which a rod, U, extends backward through a stationary guide, $d$, to receive a spiral spring, V, which is mounted on its outer end and held under compression by an adjusting-nut, W. This spring and rod tend to elevate the trip-arm and depress the arm R toward the clutch. The gavel bearing on the trip-arm R depresses its end, and through the rock-shaft lifts the arm T out of engagement, thereby permitting the parts of the latter to engage under the action of the spring $g$, and transmits motion to the binding and tying devices. This action continues during the presence of the gavel above the arm R. The discharge of the bundle releases the trip-arm R, permits it to rise, and thereby permits the arm T to descend until its roller $i$ engages the spiral groove or flange of the clutch. In consequence of this engagement the arm T, being fixed against lateral movement, the part $G^2$ of the clutch is caused to move endwise on the shaft out of engagement with the part $G'$, thereby stopping the motion of the needle and tyer. The packer-shaft is required to make a number of revolutions during the ascent of the needle and the operation of the tyer, and is required to continue its rotation after the bundle is relieved from the compressor $F'$, so that it no longer bears forcibly on the trip-arm. In consequence of this action it is necessary to provide mechanical means for holding the arm T positively out of engagement with the clutch. For this purpose I provide the heel end of the needle-arm or its shaft with a cam-surface, $e$, arranged to act against the heel projection $f$ on the trip-arm R, as plainly represented in Figs. 1 and 8. The trip-arm being depressed by the gavel, is held in the depressed position thereby until the needle is partially elevated, whereupon the projection $e$, encountering the trip-arm, holds the same down in a positive manner until the bundle has been discharged. In this manner the danger of the arm T unlocking the clutch at an improper time is avoided.

Referring next to the compressor-arm $F'$, against which the gavel is compacted, it is made of an angular or L shape, and pivoted at the inner end of its foot, as shown in Fig. 8, to the upper end of a link, $k$, arranged to swing loosely upon a rock-shaft, $l$. This rock-shaft bears a crank, $m$, which is connected by a link, $n$, to the outer heel end of the compressor, so that when the shaft is rocked in one direction it will have the effect of throwing the compressor upward through and above the table in position to support the gavel, while a rocking motion in the opposite direction will have the effect of tipping the compressor downward to the position shown in Fig. 8 in order that the bundle may be discharged over it. The foot of the compressor is connected at its forward end by a link, $o$, to a heel projection on the needle or to an equivalent projection on the needle-shaft, so that as the needle rises to carry the cord around the gavel the link is caused to draw the compressor bodily forward toward the needle, thereby compressing the gavel between the needle and compressor. Heretofore it has been customary to pivot the compressor for this purpose directly to the heel end of the needle, the result of which was that before the completion of the action of the needle the compressor was tipped downward and backward in such manner as to relieve a part of the grain at the top and cause an undue strain on the binding-cord. By my improvement this trouble is avoided, as the compressor is drawn and held squarely against the grain.

For the purpose of giving to the compressor $F'$ a yielding or spring support during its action on the gavel, I provide, instead of the customary spring-connections, the arrangement represented in Fig. 5. The rock-shaft $l$, to which the heel of the packer is connected by the link $n$, as before explained, is provided on its outer end with a crank-arm, $q'$, the end of which is pivoted to an arm, $r'$, which is in turn jointed to a second arm, $s'$, connected at its upper extremity to an angular lever, $t'$, pivoted to the main frame and actuated by means of a stud on its side engaging in a cam-groove, $u'$, in the main gear-wheel, before referred to. The two parts $r'$ and $s'$ constitute jointly a toggle-lever. They are provided at their adjacent ends with lateral arms or extensions $w'$ and $w''$, through which there is extended a spindle, $x'$, bearing on one end a spiral spring, $y'$, and a compression-nut, $z'$. These parts tend to hold the two parts of the lever out of line with each other, or, in other words, in a bent condition. While in this bent condition the lever, through intermediate connections, serves to sustain the compressor $F'$ in its normal operative position. When, however, the compressor is subjected to an excessive strain, the spring $y'$ will yield and permit the toggle-lever $r'$ $s'$ to straighten and elongate, the effect of which is to permit the rock-shaft $l$ to turn in the direction indicated by the arrow in Fig. 5, and thereby permit the compressor to tip backward to a limited extent. By turning the nut $z'$ the tension of the spring may be varied, so as to cause the compressor to offer more or less resistance. The jointed lever $r'$ $s'$ is moved bodily upward and downward by the action of the cam-wheel and lever $t'$ at the proper time to lower the compressor below the table when the bundle is to be discharged, and to raise it thereafter to its normal position.

The jointed lever and spring constitute an improved yielding connection between the cam-wheel and compressor-shaft, to take the place of the cumbrous and complicated connections now employed.

Passing now to the details of the binder-arm and to the cord-fastening devices, X represents the rotary tying-bill, located above the breast-plate, and rotated intermittingly by means of teeth formed on the large wheel Y, which latter is mounted on the usual horizontal shaft, Z, which is sustained, as usual, in the overhanging bracket or standard of the binder-frame, and provided at its outer end with the gear-wheel K, before referred to.

The tying-bill, which is plainly represented in Figs. 14 and 15, consists of a spindle provided at one end with two jaws extending at substantially right angles to the axis, one jaw being rigid and the other pivoted, in order that they may twist the cord into a loop and then grasp the extremity between them for the purpose of drawing it through the loop to finish the knot. The inner or pivoted jaw, $q$, is extended at its heel end and provided with a roller to ride against the stationary cam $s''$, by which it is opened. It is closed by means of a sliding rod, $r$, mounted in a groove in the spindle, and acted upon by a stationary spring, $s$. These features constitute no part of the present invention.

The pressure applied to the pivoted jaw causes, in machines of the usual construction, an excessive friction and wear upon the roller of the jaw and upon the opening-cam. To avoid this objection, I provide means for relieving the jaw from the action of the closing-spring during the fore part of the revolution of the tyer. The most simple means at present known to me for this purpose is a cam or flange, $a^3$, formed on the face of the large driving-wheel Y, as shown in Figs. 21 and 22, in such form and position as to ride beneath the end of the spring $s$ and lift the same for a short period of time.

In rear of the tying-bill there is arranged a revolving cord-clamping disk, $t$, which is notched at its periphery and arranged to enter at one edge a stationary grooved plate, $u$, whereby the cord previously laid in position in one of the notches is clamped tightly in place. This clamping-disk receives an intermitting rotation by means of a thread or rib, $u$, formed on the periphery of the wheel Y, this feature being foreign to the present invention.

Between the tying-bill and the clamping-wheel is located the cord-cutting knife $x$, made of an angular or L shape, and pivoted at its angle to the frame at $Z^3$, its cutting-edge being extended between the tyer and clamp in such position that the cord will be laid across it by the needle-arm, while the opposite end is extended to one side of the wheel Y in position to be acted upon by an incline or cam, $z$, formed thereon. The wheel Y makes one complete revolution during the binding of each bundle, and during the course of its revolution the cam $z$, acting at the proper time on the knife-arm $x$, causes the blade to rise against the overlying cord and sever the same in rear of the tyer, thereby disconnecting the applied band from the remaining portion of the cord, but leaving the ball or spool end confined within the clamp. A flat spring, $h'$, secured to the breast-plate at one end, bears at its opposite end against the knife, as shown in Figs. 9 and 10, to throw its edge downward after the action of the cam $z$. The breast-plate is provided, as usual, with a slot, through which the point of the needle ascends in order to carry the end of the band over the tying-bill and clamping-wheel. This slot, instead of being made in the usual form, is shaped as represented in Fig. 11. The main portion lies in a vertical plane passing one side of the tyer-spindle, so that the point of the needle-arm may pass closely by the spindle. As the slot approaches the tyer, it is curved laterally thereunder toward the tyer-spindle. It is carried laterally beneath its spindle, as shown at $b'$, and is then continued backward with an inclination in the opposite direction or away from the spindle, as shown at $c'$. The tyer-driving wheel is provided with teeth $n'$ and two rims or delay-surfaces, $o'$ and $p'$, which co-operate with the surface $l'$, the teeth and the shoulder $m'$ of the pinion imparting to the tyer at each revolution of the wheel a single revolution, with a momentary stoppage in the position indicated by the dotted lines in Fig. 11 to facilitate the discharge of the knot.

The peculiar formation of the slotted breast-plate and the mechanism for imparting the intermitting rotation to the tyer form no part of the present invention, being made the subject-matter of a separate application filed on the 22d day of October, 1885, No. 180,659.

In order to insure the proper passage of the cord through the crooked or offset portion of the slot in the breast-plate against the tying-bill, I make use of a yielding tucker-arm, $g'$, attached to the needle or binder arm on its inner side, and arranged to ride against the under side of the breast-plate. This tucker, which may be variously formed, is preferably constructed, as shown in Fig. 10, by bending an elastic wire into a U form, placing it astride the body of the needle, its ends extending rearward over lugs $k^2$ on the needle-guard, with the extremities coiled around or otherwise secured to studs $g^2$, or equivalent fastening devices, whereby the forward or free end is caused to spring outward tightly against the inner edge of the needle-point. The forward end of the tucker is made of a width greater than that of the slot in the breast-plate. While the needle is depressed the tucker lies closely against its inner face, and is inactive; but as the needle ascends the forward end of the tucker is caused to ride against the under surface of the breast-plate, and, being held downward thereby, it rides forward thereunder, driving the cord before it until it passes beneath or beyond the tyer, as shown in Figs. 10 and 21. It insures the passage of the cord closely against the bill and downward toward its spindle.

The discharge of the bound bundle may be effected by any suitable means, my invention having no special relation thereto; but I recommend the use of the ordinary revolving arm or arms $Z^2$, secured to the shaft which carries the cam and gear-wheel K and the wheel for actuating the knotter and attendant parts.

In order to increase and diminish the tension of the cord, I provide the devices shown in Figs. 17 to 20, consisting of a fixed casting having two arms, $b''$, through which the cord passes, and of a rock-shaft, $c''$, having a long arm, $d''$, and a short arm, $e''$, both perforated for the passage of the cord through their ends. The rock-shaft is mounted in the casting, so that its arms may swing to and fro past the fixed arms or guides, and the entire device is applied to the machine in such position that the point of the needle in passing it will extend the cord therefrom first in one direction and then in the other. The cord being passed through the four arms and carried to and fro by the vibration of the needle, will, by straining on the long arm $d''$, cause it and its companion $c''$ to assume such changing relations to the fixed arms that the cord will be first compelled to assume a bent or irregular course and then permitted to straighten again. The result is an increasing and decreasing tension of the cord, the tension being increased as required while the band is being laid around the bundle.

While I have represented in the drawings the preferred form and arrangement of all the parts, it is to be understood that the details man be varied in many respects without changing the mode of action or passing outside of the limits of the invention. Among the modifications of this character would be the formation of the cam $e$ independently of the needle, instead of in one piece therewith, and the attachment of the link $o$ to an arm or projection on the needle-shaft, instead of attaching it directly to the needle.

Operation: A bundle having been bound and discharged, the parts assume the positions represented in Figs. 2, 3, 5, and 6, the arm T holding the clutch $G'$ $G^2$ disconnected, so that the binding devices remain at rest while the packers continue their action. The grain delivered from the harvester upon the binding-table in a continuous stream, as usual, is carried by the packer beneath the breast-plate, and accumulated and compacted into a gavel against the compressor F' and on top of the trip-arm R. When the gavel attains the proper size, it acts with sufficient pressure to overcome the spring V and depress the trip-arm, which, through its rock-shaft, causes the disengaging-arm to rise from and release the sliding part G' of the driving-clutch, whereupon the clutch is thrown into engagement by the spring and caused to impart motion through the intermediate parts to the binding mechanism. The cord, held at one end in the clamping-wheel, extends thence over the tyer-bill beneath the gavel to the eye of the needle, and thence to the ball, spool, or other source of supply. The needle ascends and carries the cord over the gavel, upward through the breast-plate, and backward across the tying-bill, and over the edge of the slot in the plate and the end of the advancing tucker. During this action the inclined edge of the slot in the plate and the end of the advancing tucker co-operate to force the two strands backward toward the heel or spindle of the tyer over or across the jaws, which at this time extend forward across the slot, as shown in Fig. 11. As soon as the cord is in position, the tyer revolves, forming a twist or loop in the cord, and grasping the same beyond or outside of the loop, as usual in other ordinary and well-known machines. Instead of completing the revolution, the tyer stops in the position shown by dotted lines in Fig. 1, with the knot formed thereon, after which the knife severs the band, the compressor-arm falls below the table, and the ejector-arm $Z^2$ revolves against the bundle, forcing it backward out of the machine, thereby drawing the knot from the tyer-bill. After the removal of the knot the tyer continues its rotation and assumes its original position. During the above action the cam at the heel of the needle acts to hold the trip-arm down, and thus prevent the arm T from disengaging the binder-driving clutch; but as the needle retreats at or about the time the bundle is delivered it releases the trip-arm, which, being also relieved from the pressure of the grain, rises and permits the arm T to fall so as to act upon and disengage the clutch. The compressor having been in the meantime elevated by the motion of the rock-shaft $l$, the binding mechanism stops in its original position, and the formation of the next gavel begins.

Having thus described my invention, what I claim is—

1. In an automatic grain-binder, the binder-driving shaft E, and its actuating-clutch provided with an inclined or spiral surface, in combination with the rock-shaft S, mounted in fixed bearings, and the trip-arm R, projecting into the path of the grain, and clutch-driving arm T, both secured to said rock-shaft.

2. In an automatic binder, the divided shaft E, having one end geared to the binder and the opposite end provided with packing devices, in combination with the clutch connecting the two parts, the trip-arm actuated by the grain, and the arm T, connected rigidly with the trip-arm shaft and arranged to act directly upon the clutch, whereby the binder is automatically thrown into and out of action by the accumulation and discharge of the gavel.

3. In an automatic binder, the divided driving-shaft E, having one end cranked and provided with packer-arms and arranged to revolve continuously, and the opposite end geared to the binding mechanism, in combination with the clutch connecting the two parts of said shaft and the rock-shaft, the trip-arm secured rigidly to said shaft and adapted to be operated by the grain, the arm secured rigidly to said shaft and arranged to directly engage the clutch, and a spring to cause the re-engagement of the clutch, said parts organized for joint operation substantially as described, whereby the cranked portion of the shaft is permitted to revolve continuously, and the motion of the binder-driving mechanism controlled by the accumulation and discharge of the gavel.

4. In combination with the binder-driving clutch, the arm T, its rock-shaft, and the trip-arm to engage the gavel, the rod U, and spring V, and the spring-adjusting devices.

5. The packer-shaft connected with the binding mechanism by the clutch, in combination with the trip-arm, and the arm connected therewith for disengaging the clutch, the needle, and the heel projection on the needle to hold the clutch-disengaging arm out of engagement, whereby the clutch is permitted to remain in engagement after the action of the bundle on the trip-arm has ceased.

6. The needle having the heel projection or cam, and the trip-arm having a heel projection to co-operate with the cam, in combination with binder-driving mechanism connected with and controlled by the trip-arm, substantially as described and shown.

7. In combination with the needle or cord-carrier, the elastic tucker consisting of a U-shaped wire or rod placed astride of and secured to the needle, as described and shown.

8. In combination with the tyer-spindle, its pinion, and the L-shaped pivoted knife extending past the edge of the wheel, the wheel Y, provided with teeth and delay-surfaces to actuate the pinion, and with the cam to operate directly upon the knife.

9. The wheel Y, provided with the cam or incline on its outer side face, in combination with the pivoted angular knife, one arm thereof extending past the edge to the outer side of the wheel, and the other arm with its cutter extending to the opposite side thereof.

10. The actuating-wheel provided with the cam or incline, the angular knife extending across the edge of the wheel, and the spring acting on the heel of the knife, combined substantially as described and shown.

11. In a grain-binder, the combination, with a movable compressor and its rock-shaft, of the arms $r'$ $s'$ with lateral extensions, the spindle $x'$, and the spring $y'$.

12. In combination with the swinging compressor, the actuating-cam $u'$, the intermediate arms or links, $r'$ $s'$, and the spring tending to hold said arms out of line, as described and shown.

13. The compressor F', in combination with the swinging support $k$, pivoted to its lower forward end, and the link $o$, attached to the compressor at or about the same point as the support $k$, and extending thence to the heel of the needle or equivalent projection on the needle-shaft, whereby the compressor is permitted to tip backward and downward around the point of connection with the link and support.

14. In combination with the needle, the compressor, the rock-shaft $l$, and its arm $m$, the links $k$ and $n$ to sustain the compressor, and the link $o$ to effect the movement of the compressor toward the needle.

15. In combination with the compressor, the link $k$, having a swinging action, and the link $n$, having both a swinging and a longitudinal motion.

16. In combination with the vibratory needle, the compressor F', its supports $k$ and $n$, and the connecting-link $o$.

17. In combination with a needle or cord-carrier, the fixed cord-guides, and the swinging guide having two arms.

18. In combination with the fixed cord-guides, the swinging guide provided with a long arm and a short arm, as described.

19. In combination with a rotary tyer-bill having a movable jaw, a spring acting to close said jaw and adapted to rise independently thereof, and a cam, substantially as described, acting to lift the spring out of operation, whereby the jaw may be relieved from the pressure of the spring without being opened.

20. In combination with the rotary tyer-bill having the movable jaw, the sliding rod to close the jaw, the independent spring acting on said rod, and the revolving wheel provided with the cam $a^3$, as described and shown.

WILLIAM BUTTERFIELD.

Witnesses:
JNO. TERPENNY,
J. FRANK DAVIS.